(12) United States Patent
Wang et al.

(10) Patent No.: US 11,580,782 B2
(45) Date of Patent: Feb. 14, 2023

(54) DISPLAY PANEL AND DISPLAY DEVICE

(71) Applicant: BOE TECHNOLOGY GROUP CO., LTD., Beijing (CN)

(72) Inventors: Qing Wang, Beijing (CN); Shengji Yang, Beijing (CN); Xiaochuan Chen, Beijing (CN); Kuanta Huang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/269,550

(22) PCT Filed: May 29, 2020

(86) PCT No.: PCT/CN2020/093393
§ 371 (c)(1),
(2) Date: Feb. 19, 2021

(87) PCT Pub. No.: WO2020/253502
PCT Pub. Date: Dec. 24, 2020

(65) Prior Publication Data
US 2021/0357638 A1    Nov. 18, 2021

(30) Foreign Application Priority Data
Jun. 19, 2019    (CN) .......................... 201910531046.9

(51) Int. Cl.
*H01L 51/50*    (2006.01)
*G06V 40/19*    (2022.01)
(Continued)

(52) U.S. Cl.
CPC ........ *G06V 40/19* (2022.01); *G02F 1/133514* (2013.01); *G06V 10/141* (2022.01);
(Continued)

(58) Field of Classification Search
CPC .... G06V 40/19; G06V 10/141; G06V 10/147; G06V 40/193; G06V 40/197;
(Continued)

(56) References Cited

U.S. PATENT DOCUMENTS

2006/0055848 A1*  3/2006  Kim ..................... G02B 5/3083
                                                    349/107
2006/0098004 A1*  5/2006  Cok ....................... G06F 3/0412
                                                    345/207
(Continued)

FOREIGN PATENT DOCUMENTS

CN    103870805 A    6/2014
CN    106019712 A    10/2016
(Continued)

OTHER PUBLICATIONS

First office action issued in Chinese Patent Application No. 201910531046.9 with search report.

*Primary Examiner* — Donald L Raleigh
(74) *Attorney, Agent, or Firm* — Chiwin Law LLC

(57) ABSTRACT

Embodiments of the present invention provide a display panel, including a display region, wherein the display region includes an iris recognition region; the display panel further includes a light conversion layer disposed in the iris recognition region, the light conversion layer is configured to convert visible light incident on the light conversion layer into infrared light, and the infrared light is emitted from a display side of the display panel.

14 Claims, 4 Drawing Sheets

(51) Int. Cl.
*G02F 1/1335* (2006.01)
*H01L 27/32* (2006.01)
*H04N 5/225* (2006.01)
*G06V 10/141* (2022.01)
*G06V 10/147* (2022.01)
*G06V 40/18* (2022.01)
*G06F 21/32* (2013.01)

(52) U.S. Cl.
CPC .......... *G06V 10/147* (2022.01); *G06V 40/193* (2022.01); *H01L 27/322* (2013.01); *H01L 51/5012* (2013.01); *H04N 5/2257* (2013.01); *G06F 21/32* (2013.01); *G06V 40/197* (2022.01)

(58) Field of Classification Search
CPC .......... G02F 1/133514; G02F 1/13338; H01L 27/322; H01L 51/5012; H04N 5/2257; G06F 21/32
See application file for complete search history.

(56) References Cited

U.S. PATENT DOCUMENTS

| | | | |
|---|---|---|---|
| 2016/0292506 A1 | 10/2016 | Rudmann et al. | |
| 2019/0065845 A1* | 2/2019 | Xu | G06F 21/32 |
| 2020/0064686 A1 | 2/2020 | Jiang et al. | |
| 2020/0133414 A1* | 4/2020 | Lee | G06F 3/04164 |
| 2021/0191190 A1 | 6/2021 | Xue et al. | |

FOREIGN PATENT DOCUMENTS

| | | | | |
|---|---|---|---|---|
| CN | 107219676 A | | 9/2017 | |
| CN | 107346089 A | | 11/2017 | |
| CN | 108846392 A | | 11/2018 | |
| CN | 108961508 A | | 12/2018 | |
| CN | 109031762 A | | 12/2018 | |
| CN | 110144650 A | * | 8/2019 | D01F 1/10 |
| CN | 110245627 A | | 9/2019 | |

* cited by examiner

DISPLAY PANEL AND DISPLAY DEVICE

This application is a U.S. National Phase Entry of International Application No. PCT/CN2020/093393 filed on May 29, 2020, designating the United States of America and claiming priority to Chinese Patent Application No. 201910531046.9, filed on Jun. 19, 2019. The present application claims priority to and the benefit of the above-identified applications and the above-identified applications are incorporated by reference herein in their entirety.

TECHNICAL FIELD

Embodiments of the present disclosure relate to a display panel and a display device.

BACKGROUND

Iris recognition technology is a biometric-based identity authentication technology, which can confirm the identity by photographing the iris of human eyes. Because the security of iris recognition is much higher than fingerprint recognition and face recognition, it has become a major development trend of user identification.

At present, some display devices have iris recognition function. In order to realize the iris recognition function, the display device generally includes a display panel, an infrared light source which emits infrared light, a camera and a processor. The existing display device with iris recognition function needs to set an infrared light source independently, which leads to a complex structure of the display device and is not suitable for the requirements of lightweight and high integration of electronic devices.

SUMMARY

At least an embodiment of the present disclosure provides a display panel, including a display region, wherein the display region includes an iris recognition region; the display panel further includes a light conversion layer disposed in the iris recognition region, the light conversion layer is configured to convert visible light incident on the light conversion layer into infrared light, and the infrared light is emitted from a display side of the display panel.

In some embodiments, a material of the light conversion layer includes a down-conversion luminescent material doped with a rare earth element.

In some embodiments, the rare earth element includes one or more selected from the group consisting of bait (Er), ytterbium (Yb), praseodymium (Pr), terbium (Tb) and thulium (Tm).

In some embodiments, one or more of the rare earth elements Er, Yb, Pr, Tb and Tm are doped in the down-conversion luminescent material in the form of oxide.

In some embodiments, the display panel is a liquid crystal display panel.

In some embodiments, the display panel is an electroluminescent display panel, the electroluminescent display panel includes a light emitting functional layer, and the light conversion layer is close to the display side of the display panel relative to the light emitting functional layer.

In some embodiments, the display panel includes a color filter layer; and a part of the color filter layer located in the iris recognition region is hollowed out.

In some embodiments, the color filter layer and the light conversion layer are arranged in a same layer.

In some embodiments, the color filter layer and the light conversion layer have an overlapping region along a thickness direction of the display panel, and the light conversion layer is close to the display side of the display panel relative to the color filter layer; the color filter layer includes a red photoresist pattern, a green photoresist pattern and a blue photoresist pattern; the light conversion layer includes a first light conversion pattern, a second light conversion pattern and a third light conversion pattern; the first light conversion pattern is directly opposite to the red photoresist pattern and is configured to convert red light emitted from the red photoresist pattern into infrared light; the second light conversion pattern is directly opposite to the green photoresist pattern and is configured to convert green light emitted from the green photoresist pattern into infrared light; and the third light conversion pattern is directly opposite to the blue photoresist pattern and is configured to convert blue light emitted from the blue photoresist pattern into infrared light.

In some embodiments, the display region includes a red sub-pixel, a green sub-pixel and a blue sub-pixel; the red sub-pixel includes a red light emitting functional layer, the green sub-pixel includes a green light emitting functional layer, and the blue sub-pixel includes a blue light emitting functional layer; the light conversion layer includes a first light conversion pattern, a second light conversion pattern and a third light conversion pattern; the first light conversion pattern is directly opposite to the red light emitting functional layer and is configured to convert red light emitted by the red light emitting functional layer into infrared light; the second light conversion pattern is directly opposite to the green light emitting functional layer and is configured to convert green light emitted by the green light emitting functional layer into infrared light; the third light conversion pattern is directly opposite to the blue light emitting functional layer and is configured to convert blue light emitted by the blue light emitting functional layer into infrared light.

In some embodiments, the first light conversion pattern, the second light conversion pattern and the third light conversion pattern are connected together.

At least an embodiment of the present disclosure further provides a display device, including the display panel described above, a light receiving sensor and a processor; the iris recognition region of the display panel is configured to emit infrared light; the light receiving sensor is configured to obtain an iris image of an eyeball in a case where the infrared light is emitted from the iris recognition region of the display panel; the processor is connected with the light receiving sensor and is configured to obtain iris feature information according to the iris image of the eyeball obtained by the light receiving sensor.

In some embodiments, the display device further includes a controller, and the controller is configured to control the iris recognition region of the display panel and a region other than the iris recognition region in the display region to emit light, respectively.

In some embodiments, the display device further includes a controller, and the controller is configured to control the iris recognition region of the display panel to emit light and control a region other than the iris recognition region in the display region not to emit light.

In some embodiments, the display device further includes a controller, and the controller is configured to control the iris recognition region of the display panel and a region other than the iris recognition region in the display region to emit light simultaneously.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure. In the drawings.

DETAILED DESCRIPTION

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
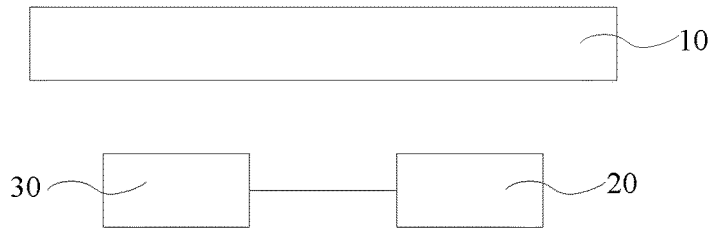
FIG. 1 is a schematic structural diagram of a display device provided by an embodiment of the present disclosure.

An embodiment of the present disclosure provides a display device which has an iris recognition function. As shown in FIG. 1, the display device 1 provided by the embodiment of the present disclosure can include a display panel 10, a light receiving sensor 20, and a processor 30.

In the display device 1 provided by the embodiment of the present disclosure, the display panel 10 includes an iris recognition region, the iris recognition region is configured to emit infrared light; the light receiving sensor 20 is configured to obtain an iris image of an eyeball in the case where the iris recognition region of the display panel 10 emits infrared light; and the processor 30 is connected with the light receiving sensor 20 and is configured to obtain iris feature information according to the iris image of the eyeball obtained by the light receiving sensor 20.

According to the embodiment of the present disclosure, the operation flow of iris recognition, for example, can include: a user starts the iris recognition function; the user aims an eye at an iris camera, and the iris camera scans an eyeball by using infrared light for imaging, so as to obtain an iris image; a controller collects the iris image acquired by the iris camera and outputs the iris image to the processor; the processor performs iris region positioning and feature point extracting based on the collected iris image and generates iris feature information, and the iris feature information as generated for the first time is stored in a memory as an iris feature template and is used as an iris feature information base for identity authentication comparison; the subsequent iris feature information collected in real time by repeating the above operations will be matched with the iris feature information base as stored, then an iris unlocking can be realized if the match is successful, and the iris unlocking cannot be realized if the match fails. By realizing the iris unlocking, operations, such as display device unlocking, APP unlocking and iris payment, can be completed. In the above operation flow, when the iris camera performs image formation to obtain an iris image, infrared light is required to scan the eyeball and to be reflected, so as to obtain the iris image of the eyeball.

In some embodiments of the present disclosure, the light receiving sensor 20 can be a camera.

In some embodiments of the present disclosure, the processor 30 can be a central processing unit (CPU) or a microprocessor.

Figure 2:
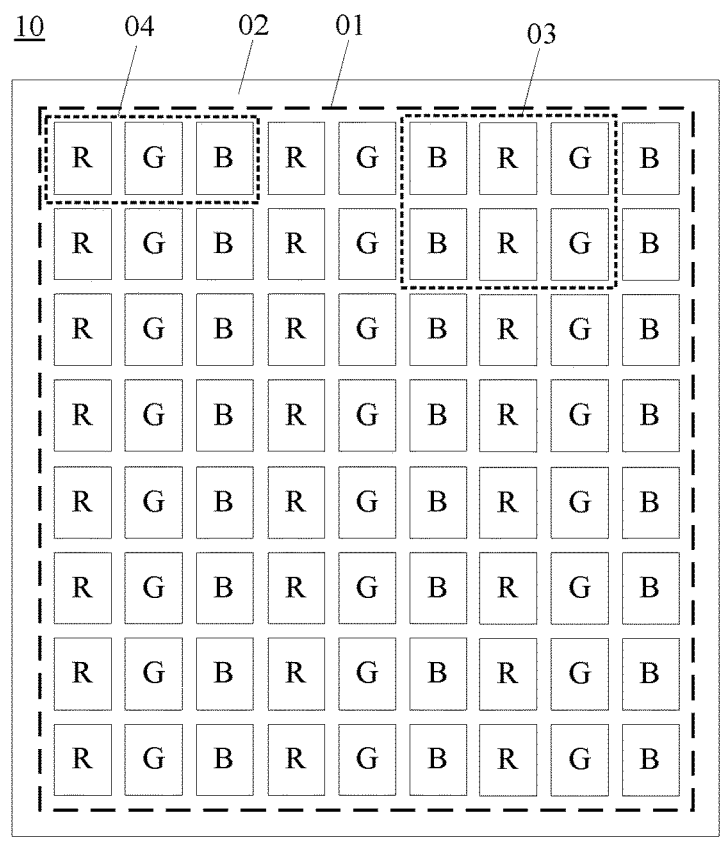
FIG. 2 is a schematic diagram of a region division of a display panel provided by an embodiment of the present disclosure.

According to the embodiment of the present disclosure, as shown in FIG. 2, the display panel 10 includes a display region 01 and a peripheral region 02, and the display region 01 includes an iris recognition region 03. The display region 01 includes a plurality of pixels 04, and each pixel 04 at least includes a red sub-pixel (R), a green sub-pixel (G) and a blue sub-pixel (B). FIG. 2 illustratively shows a case where the peripheral region 02 surrounds the display region 01, but the embodiment of the present disclosure is not limited thereto. The peripheral region 02 can be configured for wiring, and in some embodiments, a gate driving circuit is disposed in the peripheral region 02.

According to the embodiment of the present disclosure, the iris recognition region 03 can be located at any position of the display region 01, as long as it does not affect the normal display of the display region 01. For example, the iris recognition region 03 can be located at the upper left corner or the upper right corner of the display region 01.

According to the embodiment of the present disclosure, the display panel 10 further includes a light conversion layer 100 disposed in the iris recognition region 03, the light conversion layer 100 is configured to convert visible light incident thereon into infrared light, and the infrared light is emitted from the display side of the display panel 10.

According to the embodiment of the present disclosure, the light conversion layer 100 is disposed in the iris recognition region 03, the light conversion layer 100 can convert visible light incident thereon into infrared light, and the infrared light is emitted from the display side of the display panel 10. Therefore, the iris recognition region 03 of the display panel 10 emits infrared light. Because the iris recognition region 03 of the display panel 10 emits infrared light, it may not display. It should be understood that the region other than the iris recognition region 03 in the display region 01 of the display panel 10 is as same as the display region 01 of a conventional display panel 10, which can emit red light, green light and blue light, and can display normally.

According to the embodiment of the present disclosure, it should be understood that in order to ensure that the infrared light emitted by the iris recognition region 03 can be received by the light receiving sensor 20, the iris recognition region 03 should include a plurality of pixels 04, that is, the iris recognition region 03 can include a plurality of red sub-pixels, a plurality of green sub-pixels and a plurality of blue sub-pixels. Because the light conversion layer 100 of the iris recognition region 03 can convert visible light into infrared light, the red sub-pixel, the green sub-pixel and the blue sub-pixel in the iris recognition region 03 no longer emit red light, green light and blue light respectively, but all emit infrared light.

The material of the light conversion layer 100 is not specifically limited in the embodiment of the present disclosure, as long as the visible light incident on the light conversion layer 100 can be converted into infrared light. A corresponding material of the light conversion layer 100 can be selected according to the type of visible light. For example, in the case where the visible light is white light, the material of the light conversion layer 100 should be a material that can convert white light into infrared light. For example, when the visible light is red light, the material of the light conversion layer 100 should be a material that can convert red light into infrared light.

In some embodiments, the material of the light conversion layer 100 can include a down-conversion luminescent material doped with a rare earth element. The down-conversion luminescent material refers to a material that can emit two or more low-energy photons after absorbing one high-energy photon.

The rare earth element doped in the down-conversion luminescent material is not specifically limited in the embodiment of the present disclosure. For example, the rare earth element described above can include one or more selected from the group consisting of bait (Er), ytterbium (Yb), praseodymium (Pr), terbium (Tb) and thulium (Tm).

In some embodiments, one or more of the rare earth elements Er, Yb, Pr, Tb and Tm described above are doped, in the form of oxide, in the down-conversion luminescent material.

The material of the light conversion layer in the embodiment of the present disclosure can be, for example, GeS2-Ga2S3-CsCI: Er, Yb.

The type of the display device 1 provided by the embodiment of the present disclosure is not specifically limited here, and can be, for example, a liquid crystal display device (LCD), and in this case, the display panel 10 in the liquid crystal display device is a liquid crystal display panel. For another example, the display device 1 can also be an electroluminescent display device, and in this case, the display panel 10 in the electroluminescent display device is an electroluminescent display panel. The electroluminescent display device can be an organic light emitting diode (OLED) display device or a quantum dot light emitting diode (QLED) display device. In the case where the electroluminescent display device is an organic light emitting diode display device, the electroluminescent display panel is an organic light emitting diode display panel. In the case where the electroluminescent display device is a quantum dot light emitting diode display device, the electroluminescent display panel is a quantum dot light emitting diode display panel.

Figure 3:
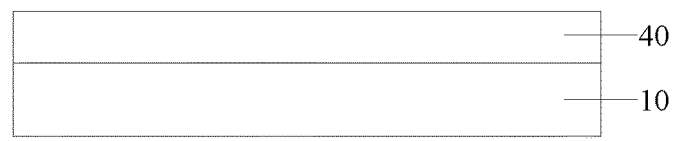
FIG. 3 is a schematic structural diagram of an electroluminescent display device provided by an embodiment of the present disclosure.

In the case where the display device 1 is an electroluminescent display device, as shown in FIG. 3, the electroluminescent display device can further include a cover glass (CG) 40, and the cover glass 40 is disposed at the light emitting side of the display panel 10.

Figure 4:
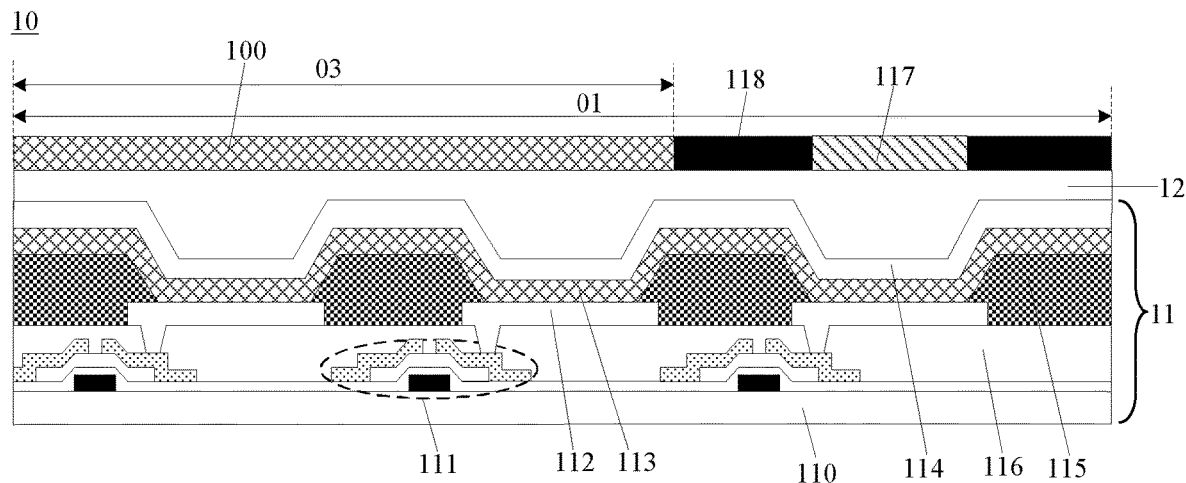
FIG. 4 is a schematic structural diagram of an electroluminescent display panel provided by an embodiment of the present disclosure.
Figure 5:
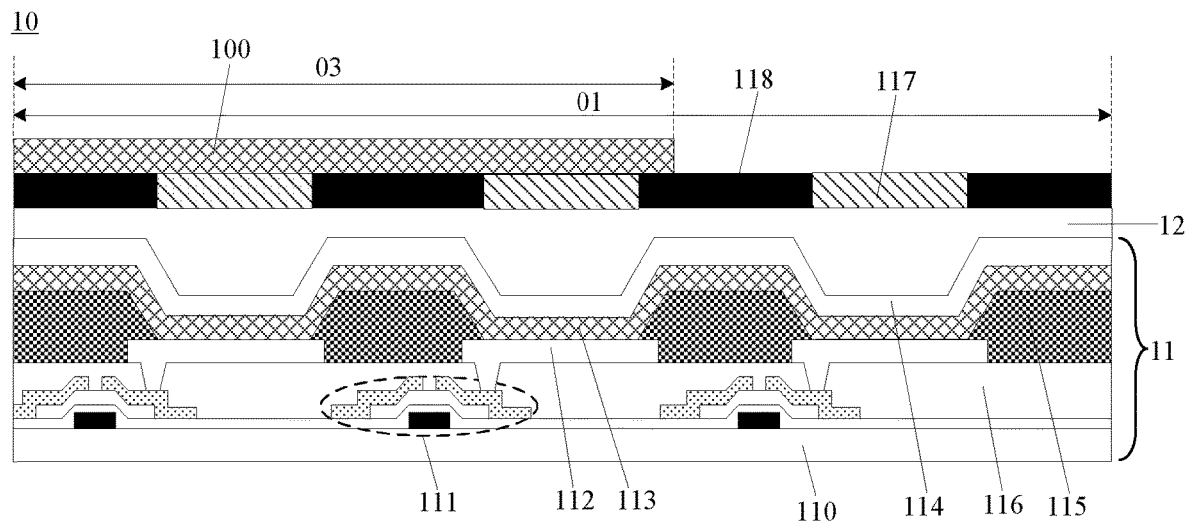
FIG. 5 is another schematic structural diagram of an electroluminescent display panel provided by an embodiment of the present disclosure.
Figure 6:
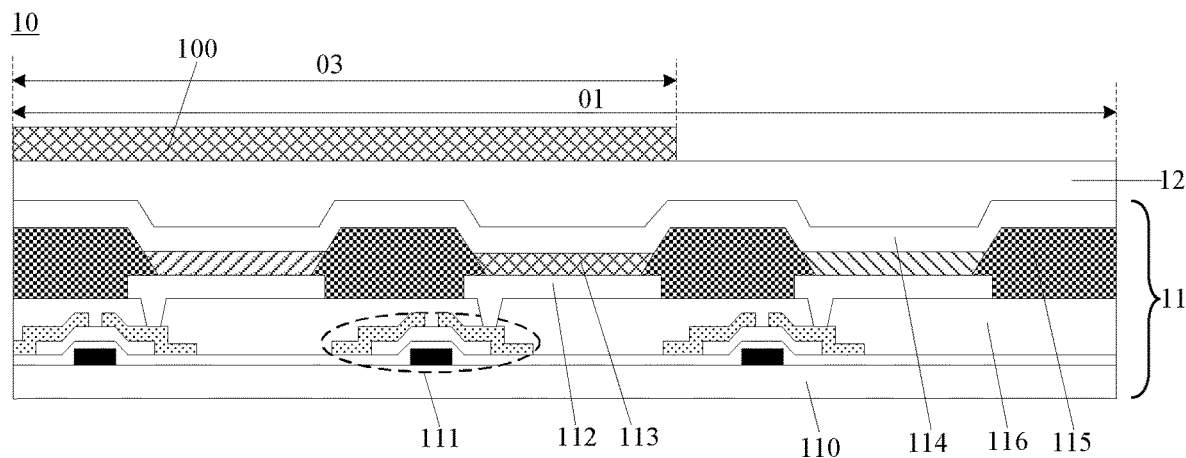
FIG. 6 is still another schematic structural diagram of an electroluminescent display panel provided by an embodiment of the present disclosure.

As shown in FIG. 4, FIG. 5 and FIG. 6, the electroluminescent display panel in the electroluminescent display device can include a display substrate 11 and an encapsulation layer 12 for encapsulating the display substrate 11.

Here, the encapsulation layer 12 can be a thin film encapsulation (TFE) or a encapsulation substrate.

Still referring to FIG. 4, FIG. 5 and FIG. 6, the display substrate 11 described above includes, in each sub-pixel, a light emitting element and a pixel driving circuit arranged on the first substrate 110, and the pixel driving circuit includes a plurality of thin film transistors 111; the light emitting element includes an anode 112, a light emitting functional layer 113, and a cathode 114, and the anode 112 is electrically connected with the drain electrode of the thin film transistor 111 serving as a driving transistor among the plurality of thin film transistors 111. The display substrate 11 can further include a pixel defining layer 115, the pixel defining layer 115 includes a plurality of opening regions, and one light emitting element is disposed in one opening region.

In some embodiments, the light emitting functional layer 113 includes an electroluminescent layer (EL). In some other embodiments, the light emitting functional layer 113 includes not only a light emitting layer, but also one or more selected from the group consisting of an election transporting layer (ETL), an election injection layer (EIL), a hole transporting layer (HTL) and a hole injection layer (HIL). In the case where the display panel 10 is an organic light emitting diode display panel, the electroluminescent layer is an organic light emitting layer. In the case where the display panel 10 is a quantum dot light emitting diode display panel, the electroluminescent layer is a quantum dot light emitting layer.

As shown in FIG. 4, FIG. 5 and FIG. 6, the display substrate 11 can further include a planarization layer 116 disposed between the thin film transistor 111 and the anode 112.

In some embodiments, as shown in FIG. 4 and FIG. 5, the light emitting functional layer 113 located in each sub-pixel emits white light. In this case, the display panel 10 can further include a color filter layer 117 disposed on a side of the encapsulation layer 12 away from the light emitting functional layer 113, and the color filter layer 117 at least includes a red photoresist pattern, a green photoresist pattern and a blue photoresist pattern. The red sub-pixel includes the red photoresist pattern, the green sub-pixel includes the green photoresist pattern, and the blue sub-pixel includes the blue photoresist pattern. In the case where the light emitting functional layer 113 emits white light, the light emitting functional layers 113 of respective sub-pixels can be connected together as shown in FIG. 4 and FIG. 5.

In addition, as shown in FIG. 4 and FIG. 5, in order to avoid crosstalk of light emitted from adjacent sub-pixels, the display panel 10 further includes a black matrix (BM) pattern 118, and the black matrix pattern is configured to space apart the red photoresist pattern, the green photoresist pattern and the blue photoresist pattern.

In some other embodiments, as shown in FIG. 6, the red sub-pixel includes a red light emitting functional layer 113, the green sub-pixel includes a green light emitting functional layer 113, and the blue sub-pixel includes a blue light emitting functional layer 113. In this case, the display panel 10 may include the color filter layer 117 disposed on the side of the encapsulation layer 12 away from the light emitting functional layer 113, or may not include the color filter layer 117. FIG. 6 illustratively shows an embodiment in which the display panel 10 does not include the color filter layer 117. In the case where the display panel 10 includes the color filter layer 117, the red light emitting functional layer 113 is directly opposite to the red photoresist pattern, the green light emitting functional layer 113 is directly opposite to the green photoresist pattern, and the blue light emitting functional layer 113 is directly opposite to the blue photoresist pattern.

In the embodiment of the present disclosure, "directly opposite to" means that the orthographic projection of a photoresist pattern on a plane in which a light emitting functional layer is located at least partially overlaps with the light emitting functional layer, and vice versa. In some examples, they may completely overlap with each other.

On this basis, the display panel 10 may include the black matrix pattern 118, or may not include the black matrix pattern 118. In the case where the display panel 10 includes the black matrix pattern 118, the black matrix pattern 118 is disposed in a non-opening region of the pixel defining layer 115.

Based on the above embodiments, in the case where the display panel 10 includes the color filter layer 117, the color filter layer 117 can be adhered to the encapsulation layer 12 by glue.

For example, in the case where the display panel 10 is an electroluminescent display panel, the light emitting functional layer 113 in the electroluminescent display panel emits light. Because the light conversion layer 100 is configured to convert visible light incident thereon into infrared light, the light conversion layer 100 is close to the display side of the display panel 10 relative to the light emitting functional layer 113. After the light conversion layer 100 converts the visible light emitted from the light emitting functional layer 113 into infrared light, because the infrared light is emitted from the display side of the display panel 10 while the color filter layer 117 can only allow red light, green light and blue light to pass through but not allow infrared light to pass through, the infrared light cannot pass through the color filter layer 117.

Based on the above embodiments, in the case where the electroluminescent display panel does not include the color filter layer 117 as shown in FIG. 6, the light conversion layer 100 can be disposed at any position on one side of the light emitting functional layer 113 close to the display side. For example, the light conversion layer 100 can be disposed between the light emitting functional layer 113 and the cathode 114, In this case, the light conversion layer 100 should not affect the function of the cathode 114 injecting electrons into the light emitting functional layer 113. For another example, the light conversion layer 100 can be disposed between the cathode 114 and the encapsulation layer 12. For still another example, the light conversion layer 100 can be disposed on the side of the encapsulation layer 12 away from the cathode 114. FIG. 6 illustrates that the light conversion layer 100 is disposed on the side of the encapsulation layer 12 away from the cathode 114, by way of example.

On this basis, in the case where the electroluminescent display panel does not include the color filter layer 117, the red sub-pixel includes a red light emitting functional layer 113, the green sub-pixel includes a green light emitting functional layer 113 and the blue sub-pixel includes a blue light emitting functional layer 113. Therefore, the light conversion layer 100 includes a first light conversion pattern, a second light conversion pattern and a third light conversion pattern; the first light conversion pattern is directly opposite to the red light emitting functional layer 113 and is configured to convert red light emitted by the light emitting functional layer 113 into infrared light; the second light conversion pattern is directly opposite to the green light emitting functional layer 113 and is configured to convert the green light emitted by the light emitting functional layer 113 into infrared light; and the third light conversion pattern is directly opposite to the blue light emitting functional layer 113 and is configured to convert blue light emitted by the light emitting functional layer 113 into infrared light.

Here, in some embodiments, the first light conversion pattern, the second light conversion pattern and the third light conversion pattern are connected together.

In the case where the electroluminescent display panel includes the color filter layer 117 (the light emitting functional layer 113 emits white light; or the light emitting functional layer 113 emits red light, green light or blue light), in some embodiments, as shown in FIG. 4, the part of the color filter layer 117 located in the iris recognition region 03 is hollowed out. Because the color filter layer 117 is hollowed out in the iris recognition region 03, after the visible light emitted from the light emitting functional layer 113 is converted into infrared light by the light conversion layer 100 located in the iris recognition region 03, the infrared light will not pass through the color filter layer 117. In the case where the color filter layer 117 is hollowed out in the iris recognition region 03, the light conversion layer 100 can be disposed at any position on one side of the light emitting functional layer 113 close to the display side of the display panel 10. The foregoing embodiments have already described these cases in details, which will not be repeated here.

Optionally, as shown in FIG. 4, the color filter layer 117 and the light conversion layer 100 are arranged in the same layer.

Here, "the color filter layer 117 and the light conversion layer 100 are arranged in the same layer" means that the color filter layer 117 and the light conversion layer 100 are located on a same bearing surface.

Illustratively, in the case where the color filter layer 117 and the light conversion layer 100 are arranged in the same layer, the color filter layer 117 can be formed firstly, and then the light conversion layer 100 can be formed; or the light conversion layer 100 can be formed firstly, and then the color filter layer 117 can be formed.

According to the embodiment of the present disclosure, in the case where the color filter layer 117 and the light conversion layer 100 are arranged in the same layer, the thickness of the electroluminescent display panel can be reduced.

In some other embodiments, as shown in FIG. 5, the display panel 10 includes the color filter layer 117, and the color filter layer 117 and the light conversion layer 100 have an overlapping region along the thickness direction of the display panel 10; and the light conversion layer 100 is close to the display side of the display panel 10 relative to the color filter layer 117. For example, the color filter layer 117 includes a red photoresist pattern, a green photoresist pattern and a blue photoresist pattern; the light conversion layer 100 includes a first light conversion pattern, a second light conversion pattern and a third light conversion pattern; the first light conversion pattern is directly opposite to the red photoresist pattern and is configured to convert red light emitted from the red photoresist pattern into infrared light; the second light conversion pattern is directly opposite to the green photoresist pattern and is configured to convert green light emitted from the green photoresist pattern into infrared light; and the third light conversion pattern is directly opposite to the blue photoresist pattern and is configured to convert blue light emitted from the blue photoresist pattern into infrared light.

Here, in some embodiments, the first light conversion pattern, the second light conversion pattern and the third light conversion pattern are connected together.

According to the embodiment of the present disclosure, in the case where the light emitting functional layer 113 emits white light and the color filter layer 117 is hollowed out in the iris recognition region 03, the light conversion layer 100 can convert white light into infrared light, the materials of all parts of the light conversion layer 100 in different sub-pixels are the same, so that the manufacturing process of the light conversion layer 100 can be simplified.

Figure 7:
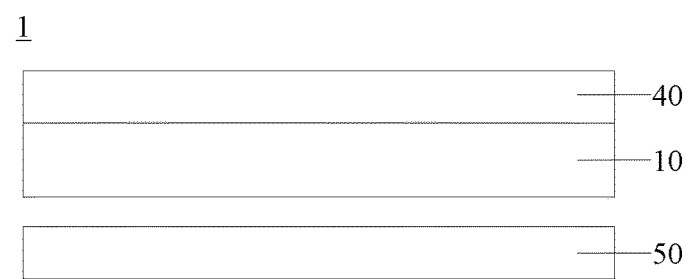
FIG. 7 is a schematic structural diagram of a liquid crystal display device provided by an embodiment of the present disclosure.

For example, in the case where the display device 1 is a liquid crystal display device, as shown in FIG. 7, the liquid crystal display device further includes a cover glass 40 and a backlight assembly 50, the cover glass 40 is disposed on a light exiting side of the display panel 10, the backlight assembly 50 is disposed on a side of the display panel 10 opposite to the light exiting side, and the backlight assembly 50 is configured to provide a light source for the display panel 10.

Figure 8:
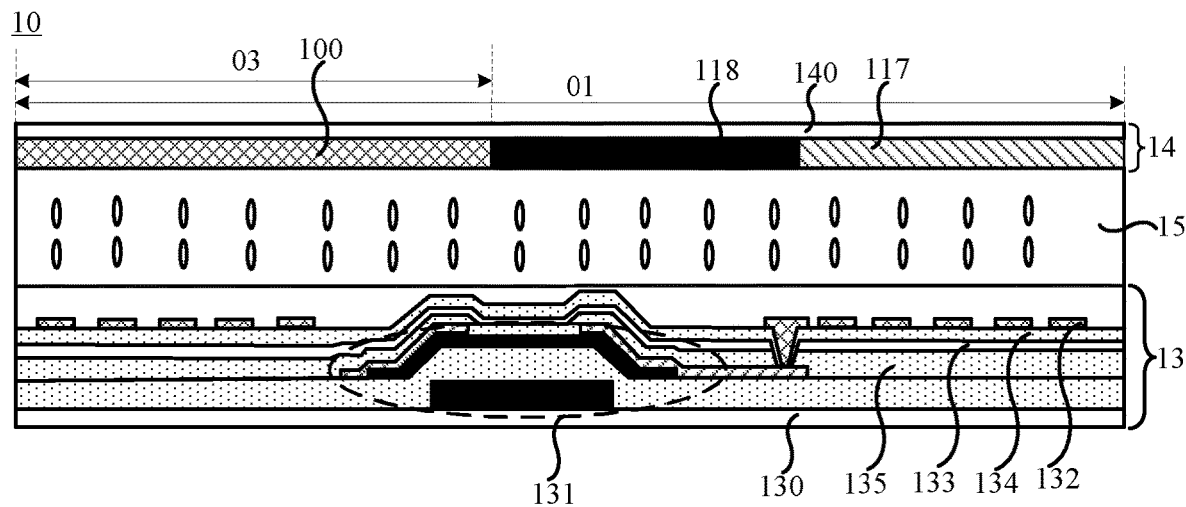
FIG. 8 is a schematic structural diagram of a liquid crystal display panel provided by an embodiment of the present disclosure.

For example, as shown in FIG. 8, the main structure of the liquid crystal display panel in the liquid crystal display device includes an array substrate 13, a counter substrate 14, and a liquid crystal layer 15 disposed between the array substrate 13 and the counter substrate 14.

For example, as shown in FIG. 8, the array substrate 13 includes, in each sub-pixel, a thin film transistor 131 and a pixel electrode 132 disposed on the second substrate 130. The thin film transistor 131 includes an active layer, a source electrode, a drain electrode, a gate electrode and a gate insulating layer, wherein the source electrode and the drain electrode are respectively in contact with the active layer, and the pixel electrode 132 is electrically connected with the drain electrode of the thin film transistor 131.

In some embodiments, as shown in FIG. 8, the array substrate 13 further includes a common electrode 133 disposed on a second substrate 130. The pixel electrode 132 and the common electrode 133 can be disposed in the same layer, and in this case, both the pixel electrode 132 and the common electrode 133 have a comb-tooth structure including a plurality of strip-shaped sub-electrodes. The pixel electrode 132 and the common electrode 133 can also be disposed in different layers, and in this case, as shown in FIG. 8, a first insulating layer 134 is disposed between the pixel electrode 132 and the common electrode 133. In the case where the common electrode 133 is disposed between the thin film transistor 131 and the pixel electrode 132, as shown in FIG. 8, a second insulating layer 135 is further disposed between the common electrode 133 and the thin film transistor 131. In some other embodiments, the common electrode 133 can be disposed on the counter substrate 14.

On this basis, in some embodiments, the counter substrate 14 includes the color filter layer 117 disposed on a third substrate 140, and in this case, the counter substrate 14 can also be referred to as a color filter substrate (CF for short). In this embodiment, the color filter layer 117 at least includes a red photoresist pattern, a green photoresist pattern and a blue photoresist pattern. In some embodiments, the counter substrate 14 further includes the black matrix pattern 118 disposed on the third substrate 140, and the black matrix pattern 118 is configured to space apart the red photoresist pattern, the green photoresist pattern and the blue photoresist pattern.

In some other embodiments, the array substrate 13 further includes a color filter layer 117 disposed on the second substrate 130, and the red photoresist pattern, the green photoresist pattern and the blue photoresist pattern are located in different sub-pixels, respectively. In this case, the array substrate can be called COA substrate (color filter on array, that is, the color filter layer is integrated on the array substrate).

In the case where the array substrate 13 includes the color filter layer 117, the array substrate 13 can include the black matrix pattern 118 disposed on the second substrate 130, or the counter substrate 14 can include the black matrix pattern 118 disposed on the third substrate 140.

For example, in the case where the display panel 10 is a liquid crystal display panel, the backlight assembly 50 provides a light source for the liquid crystal display panel, and the light conversion layer 100 converts visible light emitted by the backlight assembly 50 into infrared light. The infrared light is emitted from the display side of the display panel 10, and the color filter layer 117 can only allow red light, green light and blue light to pass through, but not allow infrared light to pass through, so the infrared light cannot pass through the color filter layer 117.

On this basis, in some embodiments, as shown in FIG. 8, the part of the color filter layer 117 located in the iris recognition region 03 is hollowed out. Because the color filter layer 117 is hollowed out in the iris recognition region 03, the visible light emitted by the backlight assembly 50 will be emitted from the display side of the display panel 10 after being incident on the light conversion layer 100 and being converted into infrared light by the light conversion layer 100, and the infrared light will not pass through the color filter layer 117.

Here, in the case where the color filter layer 117 is hollowed out in the iris recognition region 03, the light conversion layer 100 can be disposed at any position in the iris recognition region 03. For example, the counter substrate 14 includes the light conversion layer 100 located in the iris recognition region 03, and the light conversion layer 100 can be disposed at any position on the third substrate 140. For another example, the array substrate 13 includes the light conversion layer 100 located in the iris recognition region 03, and the light conversion layer 100 can be arranged at any position on the second substrate 130.

Optionally, as shown in FIG. 8, the color filter layer 117 and the light conversion layer 100 are disposed in the same layer. The foregoing embodiments have described in details that the color filter layer 117 and the light conversion layer 100 are arranged in the same layer, which will not be repeated here.

According to the embodiment of the present disclosure, in the case where the color filter layer 117 and the light conversion layer 100 are disposed in the same layer, the thickness of the liquid crystal display panel can be reduced.

According to the embodiment of the present disclosure, in the case where the part of the color filter layer 117 in the iris recognition region 03 is hollowed out, the light conversion layer 100 directly converts white light emitted from the backlight assembly 50 into infrared light, the materials of all parts of the light conversion layer 100 in different sub-pixels are the same, so that the manufacturing process of the light conversion layer 100 can be simplified.

Figure 9:
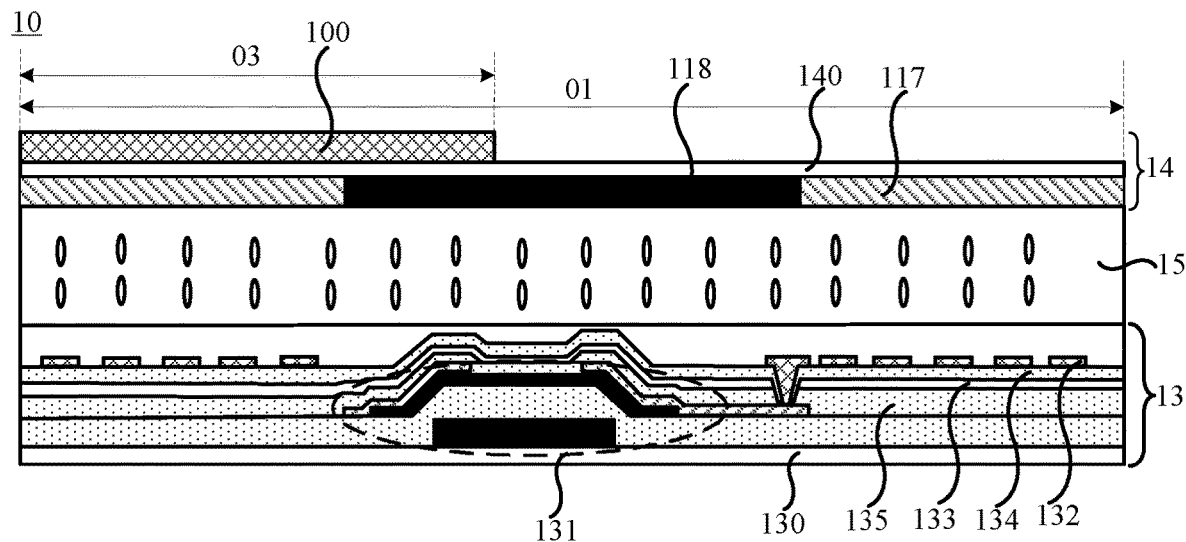
FIG. 9 is a schematic structural diagram of another liquid crystal display panel provided by an embodiment of the present disclosure.

In some other embodiments, as shown in FIG. 9, the display panel 10 can include the color filter layer 117; the color filter layer 117 and the light conversion layer 100 have an overlapping region along the thickness direction of the display panel 10; and the light conversion layer 100 is close to the display side of the display panel 10 relative to the color filter layer 117.

On this basis, the color filter layer 117 includes a red photoresist pattern, a green photoresist pattern and a blue photoresist pattern; the light conversion layer 100 includes a first light conversion pattern, a second light conversion pattern and a third light conversion pattern; the first light conversion pattern is directly opposite to the red photoresist pattern and is configured to convert red light emitted from the red photoresist pattern into infrared light; the second light conversion pattern is directly opposite to the green photoresist pattern and is configured to convert green light emitted from the green photoresist pattern into infrared light; and the third light conversion pattern is directly opposite to the blue photoresist pattern and is configured to convert blue light emitted from the blue photoresist pattern into infrared light.

In the embodiment of the present disclosure, "directly opposite to" means that the orthographic projection of a photoresist pattern on a plane in which a light emitting functional layer is located at least partially overlaps with the light emitting functional layer, and vice versa. In some examples, they may completely overlap with each other.

In the case where the counter substrate 14 includes the color filter layer 117 and the light conversion layer 100, the color filter layer 117 and the light conversion layer 100 may be disposed at the same side of the third substrate 140 or at different sides of the third substrate 140.

Based on the above embodiments, no matter whether the display panel 10 is a liquid crystal display panel or an electroluminescent display panel, in some embodiments, in the case where the display panel 10 includes the black matrix pattern 118, the part of the black matrix pattern 118 located in the iris recognition region 03 is hollowed out.

In this case, because the black matrix pattern 118 is hollowed out in the iris recognition region 03, it can be avoided that the black matrix pattern 118 absorbs part of the visible light to result in the reduction of the visible light incident on the light conversion layer 100, thus avoiding the reduction of the infrared light converted by the light conversion layer 100.

The first substrate 110 and the second substrate 130 in the foregoing embodiments can be glass substrates or silicon-based substrates. In the case where the first substrate 110 and the second substrate 130 are silicon-based substrates, a pixel driving circuit can be formed on the silicon-based substrate by CMOS techniques, so that the manufacturing processes of the display substrate 11 and the array substrate 13 can be simplified, the integration level of the display substrate 11 and the array substrate 13 can be improved, and high PPI (Pixels Per Inch) display can be realized.

In the prior art, a display device having iris recognition function generally includes a display panel and an infrared light source, and the infrared light source can be, for example, a light emitting diode that emits infrared light. Due to the need of arrangement of an infrared light source separately, the structure of this display device having iris recognition function is complex, which is not suitable for the requirements of lightweight and high integration of electronic devices. In contrast, the display device provided by the embodiments of the present disclosure includes a display panel, a light receiving sensor and a processor, wherein the display panel includes an iris recognition region and a light conversion layer arranged in the iris recognition region, and the light conversion layer can convert visible light incident thereon into infrared light, and the infrared light exits from the display side of the display panel. Therefore, in the case where iris recognition is performed based on the display device provided by the embodiments of the present disclosure, the iris recognition region on the display panel can be configured to emit infrared light, the light receiving sensor obtains the iris image of the eyeball when the iris recognition region emits infrared light, the processor obtains the iris feature information according to the iris image of the eyeball obtained by the light receiving sensor and matches the iris feature information with the iris feature information base as stored, then an iris unlocking can be realized if the match is successful, and the iris unlocking cannot be realized if the match fails. Because the iris recognition region of the display panel in the display device provided by the embodiments of the present disclosure can emit infrared light, it is unnecessary to arrange an infrared light source separately, which simplifies the structure of the display device, is beneficial to the light weight of the display device, and improves the integration level of the display device.

In some embodiments, the display device 1 can further include a controller. For example, the controller can be configured to control the iris recognition region 03 of the display panel 10 and a region other than the iris recognition region in the display region 01 to emit light, respectively. For example, the controller can also control only the iris recognition region 03 of the display panel 10 to emit light and control the region other than the iris recognition region 03 in the display region 01 not to emit light. For example, the controller can also control the iris recognition region 03 of the display panel 10 not to emit light and control the region other than the iris recognition region 03 in the display region 01 to emit light. Of course, the controller can also control the iris recognition region 03 of the display panel 10 and the region other than the iris recognition region 03 in the display region 01 to emit light simultaneously.

Here, when performing iris recognition, the controller, on one hand, can control the iris recognition region 03 to emit infrared light, and the controller, on the other hand, can control the region other than the iris recognition region 03 in the display region 01 to emit light, that is, control the region other than the iris recognition region 03 in the display region 01 to display, and can also control the region other than the iris recognition region 03 in the display region 01 not to emit light, that is, control the region other than the iris recognition region 03 in the display region 01 not to display.

In the embodiment of the present disclosure, the display device 1 includes a controller and the controller can control the iris recognition region 03 of the display panel 10 and the region other than the iris recognition region in the display region 01 to emit light, respectively, so that the region other than the iris recognition region 03 in the display region 01 can be selected to emit light or not to emit light according to the needs of customers when performing iris recognition, thus satisfying the needs of different customers.

The display device 1 provided by the embodiments of the present disclosure can be a display device of ordinary size or a micro display device. The micro display device can be applied in the field of VR (Virtual Reality) or AR (Augmented Reality) as a near-eye display device.

As described above, the embodiments of the present disclosure provide a display panel and a display device. The display panel includes a light conversion layer disposed in an iris recognition region, the light conversion layer can convert visible light incident thereon into infrared light, and the infrared light is emitted from the display side of the display panel. Therefore, when performing iris recognition, the iris recognition region on the display panel can be configured to emit infrared light; the light receiving sensor can obtain the iris image of the eyeball when the iris recognition region emits infrared light; the processor can obtain iris feature information according to the iris image of the eyeball acquired by the light receiving sensor, and match the iris feature information with the stored iris feature information base, then an iris unlocking can be realized if the match is successful, and the iris unlocking cannot be realized if the match fails. Because the iris recognition region of the display panel provided by the embodiments of the present disclosure can emit infrared light, it is unnecessary to arrange an infrared light source separately, which simplifies the structure of the display device, is beneficial to the light weight of the display device, and improves the integration level of the display device.

The above are merely specific embodiments of the present disclosure, but the protection scope of the present invention is not limited thereto. Any person skilled in the art can easily conceive of changes or substitutions within the technical scope disclosed in the present invention, which should be covered within the protection scope of the present invention. Therefore, the protection scope of the present invention should be subject to the protection scope of the claims.

The present application claims priority to Chinese patent application No. 201910531046.9, filed on Jun. 19, 2019, the entire disclosure of which is incorporated herein by reference as part of the present application.

What is claimed is:

1. A display panel, comprising a display region, wherein the display region comprises an iris recognition region;
the display panel further comprises a light conversion layer disposed in the iris recognition region, the light conversion layer is configured to convert visible light incident on the light conversion layer into infrared light, and the infrared light is emitted from a display side of the display panel, wherein
the display panel is an electroluminescent display panel, the electroluminescent display panel comprises a light emitting functional layer, and the light conversion layer is close to the display side of the display panel relative to the light emitting functional layer,
the display panel further comprises a color filter layer and a black matrix layer; and the color filter layer and the black matrix layer are not provided in the iris recognition region, and
the display panel further comprises a plurality of subpixels each including the light emitting functional layer, and the light emitting functional layer emits white light so that portions of the light conversion layer located in the plurality of subpixels have the same material.

2. The display panel according to claim 1, wherein the material of the light conversion layer comprises a down-conversion luminescent material doped with a rare earth element.

3. The display panel according to claim 2, wherein the rare earth element comprises one or more selected from the group consisting of bait (Er), ytterbium (Yb), praseodymium (Pr), terbium (Tb) and thulium (Tm).

4. The display panel according to claim 3, wherein one or more of the rare earth elements Er, Yb, Pr, Tb and Tm are doped in the down-conversion luminescent material in the form of oxide.

5. The display panel according to claim 1, wherein the color filter layer and the light conversion layer are arranged in a same layer.

6. The display panel according to claim 1, wherein the color filter layer and the light conversion layer have an overlapping region along a thickness direction of the display panel, and the light conversion layer is closer to the display side of the display panel relative to the color filter layer;
the color filter layer comprises a red photoresist pattern, a green photoresist pattern and a blue photoresist pattern;
the light conversion layer includes a first light conversion pattern, a second light conversion pattern and a third light conversion pattern; the first light conversion pattern is directly opposite to the red photoresist pattern and is configured to convert red light emitted from the red photoresist pattern into infrared light; the second light conversion pattern is directly opposite to the green photoresist pattern and is configured to convert green light emitted from the green photoresist pattern into infrared light; and the third light conversion pattern is directly opposite to the blue photoresist pattern and is configured to convert blue light emitted from the blue photoresist pattern into infrared light.

7. The display panel according to claim 6, wherein the first light conversion pattern, the second light conversion pattern and the third light conversion pattern are connected together.

8. A display device, comprising the display panel according to claim 1, a light receiving sensor and a processor;
the iris recognition region of the display panel is configured to emit infrared light;
the light receiving sensor is configured to obtain an iris image of an eyeball in a case where the infrared light is emitted from the iris recognition region of the display panel; and
the processor is connected with the light receiving sensor and is configured to obtain iris feature information according to the iris image of the eyeball obtained by the light receiving sensor.

9. The display device according to claim 8, wherein the display device further comprises a controller, and
the controller is configured to control the iris recognition region of the display panel and a region other than the iris recognition region in the display region to emit light, respectively.

10. The display device according to claim 8, wherein the display device further comprises a controller, and
the controller is configured to control the iris recognition region of the display panel to emit light and control a region other than the iris recognition region in the display region not to emit light.

11. The display device according to claim 8, wherein the display device further comprises a controller, and
the controller is configured to control the iris recognition region of the display panel and a region other than the iris recognition region in the display region to emit light simultaneously.

12. The display panel according to claim 6, wherein the first light conversion pattern, the second light conversion pattern and the third light conversion pattern are connected together.

13. The display device according to claim 8, wherein the material of the light conversion layer comprises a down-conversion luminescent material doped with a rare earth element.

14. The display device according to claim 8, wherein
the color filter layer and the light conversion layer have an overlapping region along a thickness direction of the display panel, and the light conversion layer is close to the display side of the display panel relative to the color filter layer;
the color filter layer comprises a red photoresist pattern, a green photoresist pattern and a blue photoresist pattern;
the light conversion layer includes a first light conversion pattern, a second light conversion pattern and a third light conversion pattern; the first light conversion pattern is directly opposite to the red photoresist pattern and is configured to convert red light emitted from the red photoresist pattern into infrared light; the second light conversion pattern is directly opposite to the green photoresist pattern and is configured to convert green light emitted from the green photoresist pattern into infrared light; and the third light conversion pattern is directly opposite to the blue photoresist pattern and is configured to convert blue light emitted from the blue photoresist pattern into infrared light.

* * * * *